Dec. 14, 1926.

V. GENNA 1,610,440

SHINGLE FORMING DEVICE

Filed May 14, 1926

Vincenzo Genna, Inventor

By C.A.Snow&Co.

Attorneys

Patented Dec. 14, 1926.

1,610,440

UNITED STATES PATENT OFFICE.

VINCENZO GENNA, OF DE RIDDER, LOUISIANA.

SHINGLE-FORMING DEVICE.

Application filed May 14, 1926. Serial No. 109,105.

This invention relates to a device for shaping metal shingles, one of the objects being to provide a simple, light and inexpensive device of this character which can be operated readily to bend sheets of metal to form them into corrugated plates for use as shingles and for like purposes.

Heretofore in the formation of structures of this type considerable metal has been required and, consequently, the device has been so heavy as to be handled with difficulty.

An object of the present invention is to reduce the amount of metal used and proportionately reduce the weight and also the cost of making the tool.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
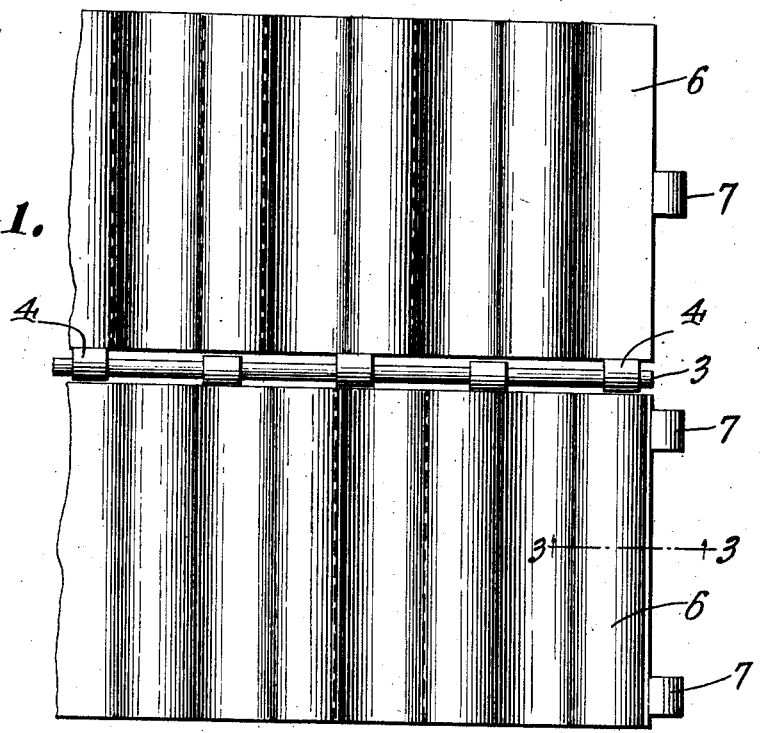
Figure 1 is a plan view of a portion of the device, the members being shown opened.

Referring to the figures by characters of reference 1 and 2 designate base members of the respective jaws of the tool, these members being connected along one side by a rod 3 extending through hinged members 4 attached to the respective bases. Mounted on each base 1 are parallel rods 5 each of which is preferably cylindrical. These rods are regularly spaced and are fitted snugly within the raised portions of a corrugated metal facing sheet 6 constituting the shaping surface of the tool. This sheet can be secured in any suitable manner to the base 1 or 2 at points between the spacing bars 5.

Figure 2:
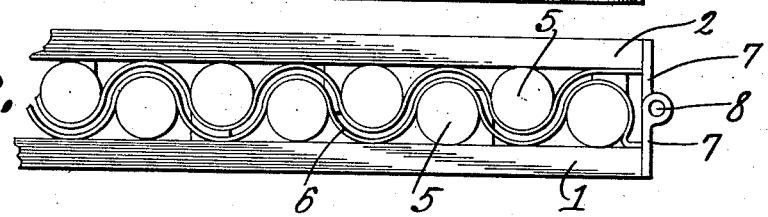
Figure 2 is a side elevation of a portion of the structure showing the jaws in the relative positions assumed thereby after a sheet of metal has been shaped between them.
Figure 3:
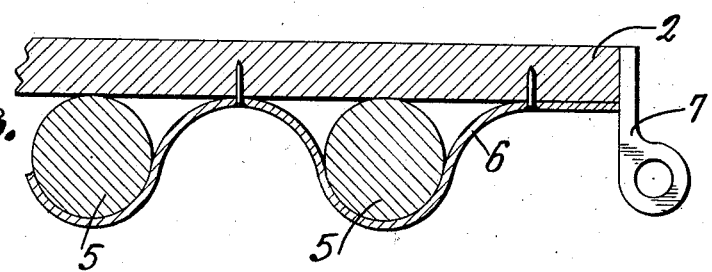
Figure 3 is an enlarged section through a portion of one of the jaws.

The bars on the respective jaws are so located that when the members are superimposed as shown for example in Figure 2, the spacing bars of one member and those portions of the facing sheet 6 contacting therewith will project into the depression formed between the spacing bars on the other member. Eyes 7 are extended from the ends of the respective members and after these members have been superimposed as shown, for example, in Figure 2, a rod 8 can be inserted through them for the purpose of holding the members against separation.

The parts 1, 2 and 5 can be made of strong wood and thus while the structure will operate efficiently for the purpose of shaping sheets of metal, the tool will not be objectionable because of its weight.

In operation a sheet to be shaped is placed on one of the members of the tool after which the other member is swung to position thereover and forced downwardly by any suitable means provided for that purpose. This can be done by means of levers, clamping screws, motor driven mechanism, or any other desired means. When the two members are moved toward each other they will obviously corrugate the sheet and if desired the members can be held in these positions as already explained by inserting a rod 8 through the eyes 7.

What is claimed is:

1. A device for corrugating metal sheets comprising opposed hingedly connected base members, spaced parallel bars secured thereto, and corrugated facing sheets secured to the bases and bridging the bars, the bars on each member being positioned for insertion between the bars on the opposed member.

2. A tool of the class described including hingedly connected base members movable into and out of superimposed positions, parallel spaced bars secured upon the respective members, and corrugated facing sheets secured to the base members and bridging the bars, the corrugations of each facing sheet being movable between the corrugations of the opposed sheet.

3. A tool of the class described including hingedly connected base members movable into and out of superimposed positions, parallel spaced bars secured upon the respective members, corrugated facing sheets secured to the base members and bridging the bars, the corrugations of each facing sheet being movable between the corrugations of the opposed sheet, and cooperating means upon the base members for holding them against relative movement.

In testimony that I claim the foregoing as my own, I have hereto affixed my signature.

VINCENZO GENNA.